US006981414B2

(12) United States Patent
Knowles et al.

(10) Patent No.: US 6,981,414 B2
(45) Date of Patent: *Jan. 3, 2006

(54) COUPLED MICROMACHINED STRUCTURE

(75) Inventors: Gary R. Knowles, Ham Lake, MN (US); Mark W. Weber, Zimmerman, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/816,719

(22) Filed: Apr. 1, 2004

(65) Prior Publication Data
US 2004/0255672 A1 Dec. 23, 2004

Related U.S. Application Data

(63) Continuation of application No. 09/884,560, filed on Jun. 19, 2001, now Pat. No. 6,722,197.

(51) Int. Cl.
*G01P 9/04* (2006.01)

(52) U.S. Cl. ............................. 73/504.12; 73/504.04; 73/514.24

(58) Field of Classification Search ............. 73/504.12, 73/504.04, 514.24, 504.14, 516.16, 514.29, 73/514.32, 651
See application file for complete search history.

(56) References Cited

U.S. PATENT DOCUMENTS

| 5,992,233 | A | * | 11/1999 | Clark ....................... 73/514.35 |
| 6,067,858 | A | * | 5/2000 | Clark et al. .............. 73/504.16 |
| 6,070,463 | A | * | 6/2000 | Moriya et al. ........... 73/504.12 |
| 6,078,016 | A | * | 6/2000 | Yoshikawa et al. ......... 200/181 |
| 6,122,961 | A | * | 9/2000 | Geen et al. .............. 73/504.12 |
| 6,230,563 | B1 | * | 5/2001 | Clark et al. .............. 73/504.04 |
| 6,276,203 | B1 | * | 8/2001 | Hulsing, II .............. 73/504.03 |
| 6,301,965 | B1 | * | 10/2001 | Chu et al. ................ 73/514.18 |
| 6,367,786 | B1 | * | 4/2002 | Gutierrez et al. ........... 267/136 |
| 6,393,913 | B1 | * | 5/2002 | Dyck et al. .............. 73/504.12 |
| 6,426,538 | B1 | * | 7/2002 | Knowles ..................... 257/417 |
| 6,481,285 | B1 | * | 11/2002 | Shkel et al. ............. 73/504.13 |
| 6,722,197 | B2 | * | 4/2004 | Knowles et al. ......... 73/504.12 |

* cited by examiner

*Primary Examiner*—Hezron Williams
*Assistant Examiner*—Jacques M. Saint-Surin
(74) *Attorney, Agent, or Firm*—McDonnell Boehnen Hulbert & Berghoff LLP

(57) ABSTRACT

A suspended, coupled micromachined structure including two proof masses and multiple support arms configured to suspend the masses above a substrate and a coupling spring element having two ends. Each end of the coupling spring element may be attached to a proof mass at a point between the proof masses. The frequency response characteristics of the proof masses may be improved.

13 Claims, 3 Drawing Sheets

COUPLED MICROMACHINED STRUCTURE

This application is a Continuation of U.S. application Ser. No. 09/884,560, filed Jun. 19, 2001, now U.S. Pat. No. 6,722,197.

BACKGROUND OF THE INVENTION

1. Field of the Invention

The present invention relates to micromachined devices and, more particularly, to a coupling system for micromachined devices.

2. Description of Related Art

Recent advances in micromachining have enabled the manufacture of various microelectromechanical systems (MEMS) that offer potential performance and cost improvements over existing non-micromachined devices. MEMS devices may be manufactured on a large scale using photolithographic techniques to etch silicon wafers, in much the same way that traditional microelectronic integrated circuits are produced in the electronics industry. In silicon-based MEMS devices fabricated using conventional integrated circuit techniques, three-dimensional structures can be integrated with electronic circuitry on the same chip, offering great potential for improvements of sensors, actuators, and other devices. Initially, MEMS devices were strictly silicon-based, like microelectronic devices, but today the term represents complete miniature devices that may or may not be silicon-based, and that can be produced using methods other than photolithographic techniques.

One MEMS device is a micro-electromechanical system gyroscope (MEMS gyro). The MEMS gyro consists of one or more oscillating proof masses that may be suspended above a substrate by support arms mounted to the substrate. The proof masses are made to oscillate at a precise frequency axially and parallel to the substrate by an electronic drive mechanism. As used herein, the term "proof mass" is defined broadly to include any mass suitable for use in a MEMS system. The MEMS gyro functions by sensing the coriolis acceleration that acts on the oscillating proof masses when the gyro is rotated. Further, the substrate typically has a recess below the proof masses that allows the gyro to oscillate freely above the substrate. The recess may be formed in the substrate by deposition of a photoresist mask that allows the substrate to be selectively etched.

When spring elements are used to suspend a proof mass above a substrate, at least one end of the spring element is typically mounted to the substrate, and the other end is typically attached to the proof mass. Because one end is fixed, and also because micro-machined structures do not have pin joints, a spring element must typically stretch as well as bend when the proof mass oscillates axially. Adding spring elasticity to each of the spring elements used to suspend a proof mass can accommodate this stretching.

When proof masses are mounted so that their spring elements must stretch to allow movement, however, the resulting spring constants in the direction of oscillation are non-linear. Non-linear spring constants can introduce frequency shifts if the amplitude of the mass' oscillation varies. Such frequency shifts are undesirable, as they can affect the accuracy of a MEMS gyroscope. Moreover, the performance of any micromachined device that employs a movable mass may be adversely affected by a non-linear spring constant in the suspension system. Thus, a suspension system with a more linear spring constant could provide improved performance in micromachined devices.

In addition, suspending a proof mass with a spring element that is configured to stretch and also to bend as the proof mass oscillates allows some freedom of motion in directions other than the direction in which the proof mass was designed to oscillate. Such freedom of motion is undesirable, can adversely affect measurements made by the gyro and, if it is great enough, may even damage or destroy the gyro if a portion of the proof mass collides with a stationary element of the gyro. Thus, a suspension system that allows great freedom of motion along one axis, while significantly restricting motion in any other direction in the plane of the substrate may provide improved reliability and performance in micromachined devices.

Further, in a MEMS gyro, two proof masses may be used to improve the sensitivity of the device over those having just one proof mass. In such a configuration, the proof masses may be driven to oscillate 180° out-of-phase with each other, so that the coriolis acceleration created by an input rotation causes each proof mass to be displaced in a direction opposite from the other proof mass. The total displacement of both proof masses (which is twice the displacement of each single proof mass) may then be measured.

When two proof masses are used to form a MEMS gyro, it is desirable for them to oscillate out-of-phase (i.e., in synchronized opposition) so that the difference in displacement of the two proof masses may be used to increase the sensitivity as described above. If the oscillation of the two proof masses were, for example, in phase rather than in synchronized opposition, the force acting on one proof mass would cause displacement in the same direction as the other proof mass, leaving no differential displacement to measure.

Further, it is desirable for both proof masses, when coupled, to oscillate at a resonant frequency (i.e., at a "coupled frequency") that occurs only when the masses oscillate in synchronous opposition, and that is also different from any other resonance of the system, such as the resonant frequency of both coupled proof masses oscillating in full synchronization. The resonant frequency of both coupled proof masses oscillating in full synchronization is very near the uncoupled resonant frequency of each proof mass, as will be described in more detail below.

Oscillation at a coupled frequency ensures that both proof masses oscillate at a desired frequency and in synchronous opposition whenever they are driven at a frequency that is near the coupled frequency. Moreover, oscillation at a coupled frequency allows the drive signal to be small, which decreases interference with the output signal of the gyro.

Ensuring that the two proof masses oscillate out-of-phase and at a discrete resonant frequency through the use of electronics, rather than by creating a coupled frequency as described, is difficult at best, and may greatly increase the complexity of the drive and control system of the MEMS gyro and may also decrease the performance of the gyro. Thus, a coupling system that helps to ensure out-of-phase operation at a discrete resonant frequency may simplify the design and improve the performance and reliability of a MEMS gyro.

SUMMARY OF THE INVENTION

A coupled micromachined structure is disclosed. The structure may include two (or more) proof masses movably mounted to a substrate, and coupled by one (or more) spring elements.

Preferably, the ends of the spring element are connected to adjacent sides of the two proof masses, serving to couple them together. Each end of the spring element is also preferably attached to each proof mass at a point along an axis of oscillation of each proof mass.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF AN EXEMPLARY EMBODIMENT

Figure 1:
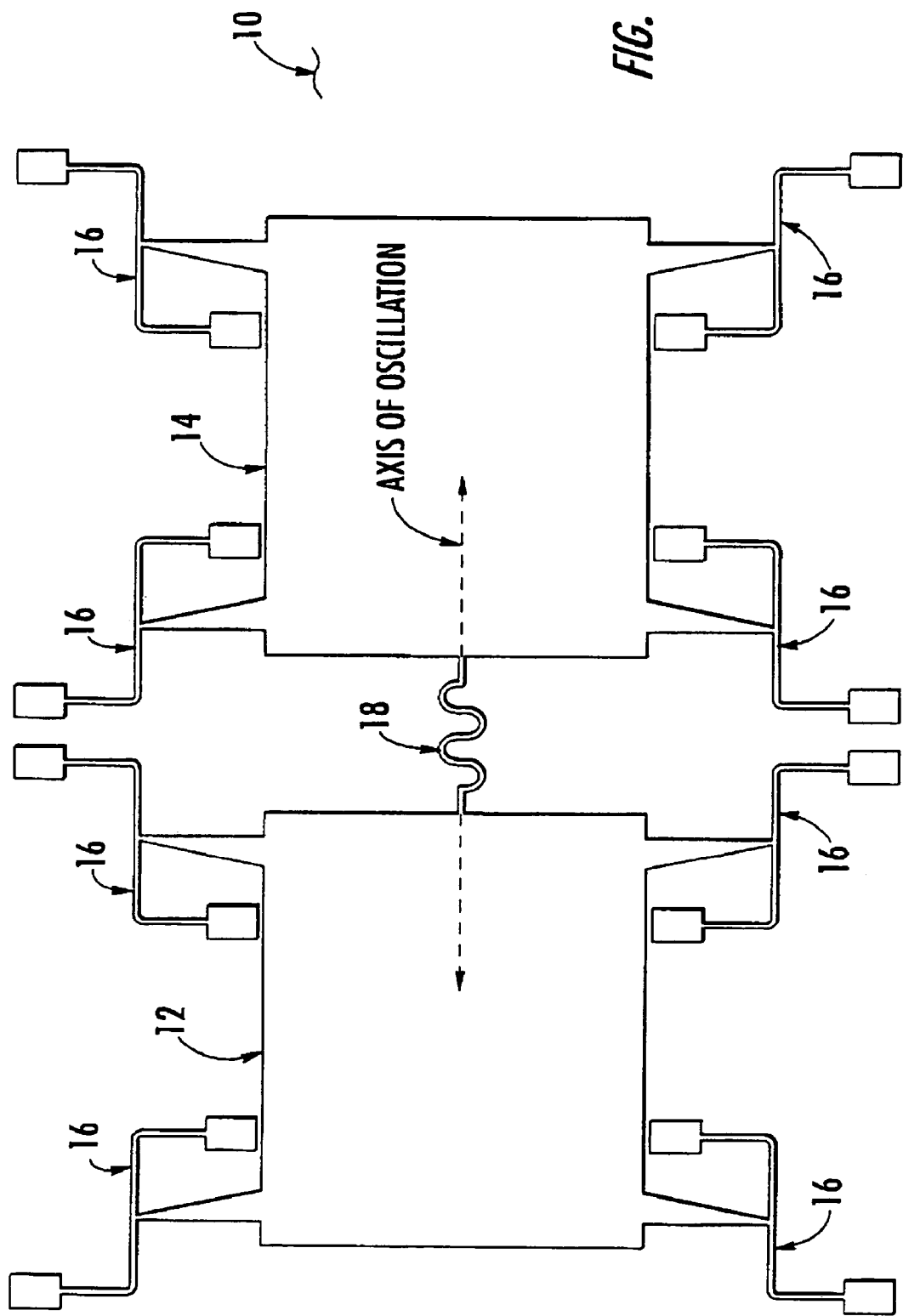
FIG. 1 is a plan view of an exemplary coupled proof mass system, with drive and sense elements omitted for clarity.

Referring to the drawings, FIG. 1 is a plan view of an exemplary embodiment of the present invention. Micromachined proof masses 12 and 14 may be suspended above substrate 10 by support arms 16 and coupled together by spring element 18. The advantages and objects of the invention would also be realized even if more than one spring element were used to couple proof masses 12 and 14 together, or even if fewer (or more) than four support arms per proof mass were used, and also if fewer or more than all of the support arms were configured as shown in FIG. 1. Proof masses 12 and 14, support arms 16, and spring element 18 may be integrally formed using any suitable micromachining technique.

In the preferred embodiment, the MEMS gyroscope may be fabricated from a single, unitary silicon substrate, but this is neither a requirement nor a limitation of the invention as it is contemplated; a MEMS gyroscope may be fabricated from various materials known to be suitable for micromachining, such as silicon, polycrystalline silicon, and other crystalline or amorphous materials. Also, although only two proof masses are shown, the invention is equally applicable to MEMS gyros having more proof masses that oscillate in opposition to each other.

Figure 2:
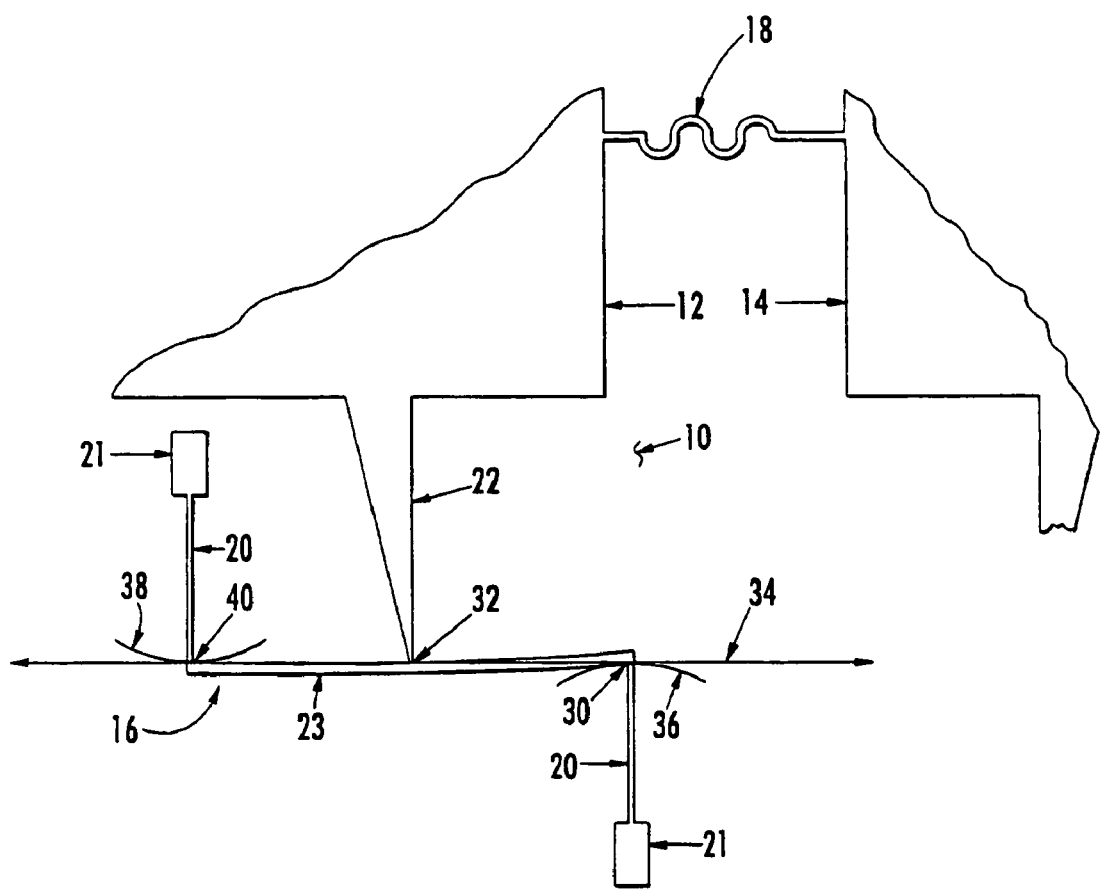
FIG. 2 is a detailed view of one support arm of an exemplary embodiment of the present invention suspending a proof mass, which is coupled a second proof mass, above the substrate with the proof mass in its undisplaced (i.e., centered) position.

Although not a requirement of the present invention, support arms 16 may preferably be configured to allow a greater degree of freedom of motion of proof masses 12 and 14 along an axis of oscillation than in any other direction in the plane parallel to substrate 10, thus ensuring that proof masses 12 and 14 oscillate along the axis of oscillation shown. Such a system is shown in FIG. 1 and will be described below. As shown in FIG. 2, proof masses 12 and 14 are connected to each support arm 16 by a connecting arm 22 that intersects each support arm 16 at a point along rigid lateral element 23. Each support arm 16 is connected to substrate 10 at two attachment points 21 via spring elements 20 extending from respective ends of each rigid lateral element 23.

Rigid lateral element 23 is relatively wider and thus more rigid than spring elements 20. Further, connecting arm 22 is designed to be narrow where it attaches to rigid lateral element 23. Due to this design, there are three effective flexure points associated with each rigid lateral element 23: two end flexure points 30 and 40 where each spring element 20 meets an end of rigid lateral element 23, and a middle flexure point 32, where connecting arm 22 meets the center of rigid lateral element 23. Effective flexure points act as pivoting joints, or pin joints, would in a larger mechanical system.

The effective flexure points 30, 40, and 32 can be determined by a finite element modeling program, such as ANSYS. The symmetrical design of the suspension system creates an axis of alignment 34. To minimize the overall flexure of the suspension system, the three flexure points 30 and 32 should lie on a straight line that is co-linear with axis of alignment 34.

If the three flexure points of each rigid lateral element 23 lie along axis of alignment 34, the overall flexure of the suspension system will be minimized. Moreover, since each support arm 16 is symmetrical about axis of alignment 34, each middle flexure point 32 will have substantially more freedom of motion along its axis of alignment 34 than in any other direction in the plane parallel to substrate 10. This principle will be described in greater detail below. Further, even if each support arm 16 is not symmetrical but the design has the overall configuration shown, it is still possible to achieve a highly linear spring rate and a greater degree of freedom of motion of middle flexure point 32 along an axis of alignment than in any other direction in the plane parallel to substrate 10. In other words, perfect symmetry is not required for the proper functioning of the suspension.

Preferably, the axes of alignment 34 of all eight support arms 16 of proof masses 12 and 14 will be parallel. Thus, the greater freedom of motion that each middle flexure point 32 has along its axis of alignment 34 will tend to confine the proof masses to an axis of oscillation that is parallel to the axes of alignment 34, since proof masses 12 and 14 are preferably connected to each support arm 16 at a middle flexure point 32.

Figure 3:
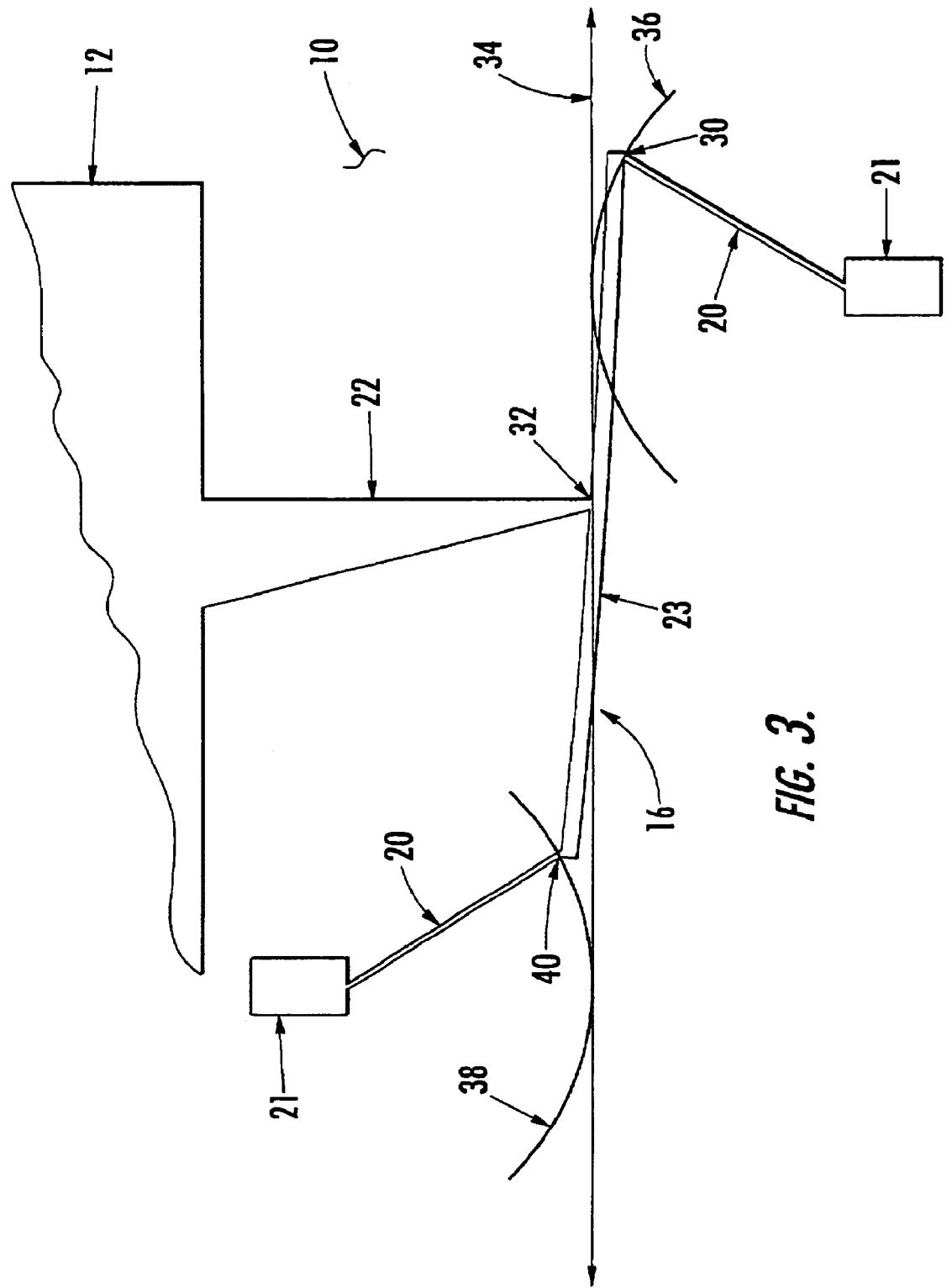
FIG. 3 is a detailed view of one support arm of an exemplary embodiment of the present invention showing in exaggerated fashion the positional relationship between one proof mass and the support arm as the proof mass is displaced from its center position.

When a driving force is exerted on proof masses 12 and 14 in the general direction of the axis of oscillation by an electrical drive system (not shown), the proof masses will be displaced to the left or right of the center position shown in FIG. 2. As proof mass 12 or 14 is displaced, for example, to the right (as shown in FIG. 3 in exaggerated form), the right spring element 20 will also move to the right. As right spring element 20 moves to the right, its flexure point 30 will travel along radius of travel 36. At the same time, the left spring element 20 will also move to the right, and its flexure point 40 will travel along its radius of travel 38.

Since end flexure points 30 and 40 move along their respective radii of travel 36 and 38 (and not along axis of alignment 34), rigid lateral element 23 will rotate in the clockwise direction as proof mass 12 or 14 is displaced in either direction away from the center position of the system, and rigid lateral element 23 will rotate in the counter-clockwise direction as proof mass 12 or 14 moves toward the centered position.

Importantly, though, as a proof mass moves along the axis of oscillation, the middle flexure point 32 will also remain on and travel along axis of alignment 34, since support arm 16 is symmetrical about middle flexure point 32. Because support arm 16 is symmetrical, each end of rigid lateral element 23 is displaced the same distance away from axis of alignment 34 as the other end (in the opposite directions) with the result that middle flexure point 32 travels along axis of alignment 34.

Although it would not be optimal for keeping flexure at a minimum, middle flexure point 32 will still travel in a straight line along the axis of alignment 34 as long as support arms 16 are symmetrical (that is, even if the three flexure points lie on a straight line that is not parallel to the axis of alignment 34 associated with a particular support arm 16).

Restricting proof masses 12 and 14 to travel along the axis of oscillation is desirable because non-linear motion could cause proof mass 12 or 14 to either crash into stationary structures (not shown) attached to substrate 10, or to adversely affect the accuracy of the sensor due to the undesirable change in the positional relationship between the proof mass and the sensing elements of the device (not shown). The restriction on the motion of proof mass 12 and 14 is limited to motion in a plane co-planar to substrate 10. In other words, proof mass 12 cannot easily rotate (for example) within a plane parallel to substrate 10, but it has (and must have) some freedom to move in either direction perpendicular to substrate 10, since such out-of-plane motion results from the rotation that is ultimately measured by the MEMS gyro.

With the configuration depicted in the figures, rigid lateral element 23 is free to rotate about its middle flexure point 32 due to the geometry of the system, as described above, and elongation of spring elements 20 is limited or eliminated when allowing proof masses 12 and 14 to move along the axis of oscillation. Instead, spring elements 20 flex at their effective flexure points 30 and 40 to allow proof mass 12 to move as desired. This flexure with limited or no elongation of spring elements 20 results in a net spring constant acting on proof mass 12 that is much more linear than it would be if it were necessary for spring elements 20 to elongate as well as bend in order to allow proof mass 12 to oscillate. In FIG. 1, eight support arms are shown having the described geometry. It should be understood that a greater or fewer number of support arms of this configuration could be used. While not optimal, even using one support arm of this type of configuration will improve the linearity of the net spring constant of the system and tend to improve the intended path of oscillation of the proof mass.

A linear spring constant is desirable for any sensor employing an oscillating proof mass because a linear spring constant tends to keep the proof mass oscillating at a more precise frequency even if the amplitude of oscillation changes. Precise frequency control improves sensor accuracy and sensitivity and also simplifies the electronic drive system used for oscillating mass sensors.

In the present invention, coupling two proof masses with a spring such as spring element 18 as shown in FIG. 1 also tends to keep the proof masses oscillating at a more precise frequency, as described below. The ends of spring element 18 are preferably connected to each proof mass at a point parallel to the axis of oscillation, as shown in FIG. 1. Further, if only one spring element is used, it may preferably be attached to each proof mass at or near the midpoint of the side of the proof mass to which it is attached, so that the forces generated by spring element 18 in the plane of oscillation will only act along the axis of oscillation of proof masses 12 and 14. In other words, such connection will minimize undesired torque on proof masses 12 and 14 caused by spring element 18 during operation.

Alternatively, if multiple spring elements are used, they may be connected to proof masses 12 and 14 symmetrically about the axis of oscillation that bisects the sides of the proof masses to which they are attached to minimize torque on the proof masses.

Proof masses 12 and 14 may be caused to oscillate along an axis of oscillation by the application of an alternating voltage between stationary driving electrodes and movable driving electrodes (not shown). Typically, a mechanical oscillating gyro component (such as a proof mass) has a resonant frequency with a very high "Q", meaning very little drive force is needed to cause it to oscillate at its resonant frequency, but much greater drive force is needed to cause it to oscillate near, but not at, its resonant frequency. The resonant frequency of a spring-mass system is determined by the moving mass and the net spring constant of the system. Thus, the resonant frequency of two similar (but uncoupled) proof mass systems such as those shown will not be the same unless the two masses and the spring constants that act on the two masses are nearly identical.

In the exemplary MEMS gyro of FIG. 1, it is desirable that two proof masses 12 and 14 oscillate in opposition to each other (i.e., in synchronized opposition) along the axis of oscillation, since the gyro functions by measuring the difference in displacement from the plane of oscillation of proof masses 12 and 14. Synchronized opposition means that both proof masses move away from each other or toward each other along the axis of oscillation at the same time.

As discussed above, a gyro that uses two proof masses oscillating in synchronized opposition has increased sensitivity (compared to a single proof mass gyro) because one proof mass will be displaced above the plane of oscillation while the other is displaced below the plane in response to an input rotation, resulting in a total displacement that is twice that of a single proof mass.

Moreover, when two proof masses oscillate at the same frequency, common-mode noise cancellation is greatly simplified. Common-mode noise is caused when any component of undesirable motion of the entire MEMS gyro is perpendicular to the substrate. Such undesirable motion will cause both proof masses to be displaced vertically (i.e., along the measurement axis) in the same direction and by substantially the same amount.

As discussed above, a MEMS gyro that uses two proof masses measures the difference in displacement from a plane of oscillation due to a rotation. If the two proof masses are displaced the same distance from the plane of oscillation due to common-mode acceleration, and if the two proof masses are oscillating in synchronized opposition, the output signals of each mass due to the common-mode noise will be nearly identical. Since the exemplary MEMS gyro measures only the difference in displacement between two proof masses, the common-mode displacement will only create a relatively small noise signal, due to slight differences in the spring constant or mass of the proof masses, as long as the proof masses oscillate at the same frequency.

On the other hand, if two identical, suspended proof masses moving in the same direction are rotated at the same rate (i.e., subjected to a common-mode acceleration), the coriolis acceleration that acts on them will be identical. Thus, the coriolis acceleration will cause these theoretical proof masses to be displaced from their planes of (initial) motion by equal amounts, and in the same direction. Similarly, if proof mass 12 and proof mass 14 were to oscillate synchronously in the same direction, they would both be displaced by substantially the same distance in the same direction in response to an input rotation, and the advantages of using two proof masses to reduce the common-mode noise signal would not be realized.

Due to inherent microscopic errors in the fabrication of the proof masses and spring elements of a MEMS gyro, the resonant frequencies of two independent (i.e., uncoupled) suspended proof masses will be slightly different, resulting in out-of-phase oscillation in response to the drive signals. Because the proof masses have a high Q but different resonant frequencies, more drive power would be required to maintain two independently driven proof mass systems in synchronized opposition.

The addition of one or more spring elements between two proof masses, however, such as spring element 18, creates a new, coupled resonant frequency. This coupled resonant frequency is higher than any other resonant frequency of the system, and it occurs only when proof masses 12 and 14 oscillate in synchronized opposition. The coupled resonant frequency is higher than any other resonant frequency of the spring-mass system because, effectively, a new spring has been added to the system, which only has an effect when the proof masses oscillate in opposition to each other. If both proof masses, while coupled by spring element 18, were to oscillate synchronously, spring element 18 would have little or no effect on the net spring constant of either mass, since the tension or compression on spring element 18 would be nearly constant because the distance between proof mass 12 and proof mass 14 would be nearly constant.

If, on the other hand, proof mass 12 and proof mass 14 oscillate in synchronized opposition, the distance between them will vary at the frequency of oscillation. This places spring element 18 under tension and compression at the frequency of oscillation, making spring element 18 analogous to a spring coupled to either uncoupled mass and a fixed point on substrate 10, which would change (i.e., increase) the net spring constant of either uncoupled proof mass. As is well known in the art, increasing the spring constant of a spring-mass system increases the resonant frequency of the system.

Thus, while it may be possible for proof masses 12 and 14, coupled by spring element 18, to oscillate in the same direction synchronously, the resonant frequency of such an oscillation would be lower than the frequency of synchronized opposed oscillation. While the length and shape of spring element 18 may vary considerably, such variation will only change the coupled frequency of the proof masses; it will not affect the creation of a new, coupled resonant frequency. Thus, the exact geometry of spring element 18 is not critical to the invention.

The coupled resonant frequency, like the resonant frequencies of independently suspended proof masses, has a high Q. Because the coupled resonant frequency has a high Q and because it is higher than any other frequency of the system, if the proof masses of an exemplary spring-coupled MEMS gyro as shown in FIG. 1 are driven with signals close to the new resonant frequency, they will oscillate at the coupled resonant frequency in synchronized opposition to each other. Oscillation in synchronized opposition simplifies the electronic drive system used for oscillating proof mass sensors as well as the rotation measuring circuitry. Thus, like a suspension system with a substantially linear spring constant, a MEMS gyro that uses a spring to couple two proof masses improves sensor accuracy and sensitivity.

Exemplary embodiments of the present invention have been illustrated and described. It will be understood, however, that changes and modifications may be made to the invention without deviating from the spirit and scope of the invention, as defined by the following claims.

What is claimed is:

1. A micromachined device comprising:
    a first proof mass;
    a second proof mass;
    a plurality of support arms attached to the first proof mass and second proof mass, each of the support arms flexibly coupling the proof masses to a substrate;
    wherein at least one of the support arms includes a first end coupled to the substrate and a second end coupled to the substrate, the at least one support arm comprising:
        a first spring element attached to the substrate;
        a second spring element attached to the substrate; and
        a rigid lateral element having a first end and a second end, the first end of the rigid lateral element connected to the first spring element and the second end of the rigid lateral element connected to the second spring element;
    wherein a proof mass is connected to the rigid lateral element at a point between the first end and the second end of the support arm and wherein the support arm is substantially diametrical about the point, in a plane that is parallel to the substrate; and
    at least one coupling spring having a first end and a second end, the first end of the at least one coupling spring connected to the first proof mass and the second end of the at least one coupling spring connected to the second proof mass.

2. The micromachined device of claim 1, wherein the first end of the at least one coupling spring is connected to a side of the first proof mass that is closest to the second proof mass and the second end of the at least one coupling spring is connected to a side of the second proof mass that is closest to the first proof mass.

3. The micromachined device of claim 1, wherein the first end of the at least one coupling spring is connected to a side of the first proof mass that is closest to the second proof mass at substantially the midpoint of the side of the first proof mass and the second end of the at least one coupling spring is connected to a side of the second proof mass that is closest to the first proof mass at substantially the midpoint of the side of the second proof mass.

4. The micromachined device of claim 3, wherein the first end of the at least one coupling spring and the second end of the at least one coupling spring lie on a straight line that comprises an axis of oscillation of the first proof mass and the second proof mass.

5. The micromachined device of claim 1, wherein the point is substantially equidistant from the ends of the rigid lateral element.

6. The micromachined device of claim 1, wherein the connection of the first spring element to the rigid lateral element creates a first end flexure point, the connection of the second spring element to the rigid lateral element creates a second end flexure point, and the connection of a proof mass to the rigid lateral element creates a middle flexure point.

7. The micromachined device of claim 1, wherein the first end flexure point, the second end flexure point, and the middle flexure point lie on a substantially straight line.

8. The micromachined device of claim 7, wherein the substantially straight line comprises an axis of alignment.

9. The micromachined device of claim 8, wherein the axis of alignment is parallel to an axis of oscillation of the proof mass.

10. The micromachined device of claim 9, wherein when at least one of the proof masses moves along the axis of oscillation, the middle flexure point where it is coupled to a rigid lateral element moves along the axis of alignment.

11. The micromachined device of claim 10, further including a second support arm having a first end coupled to the substrate and a second end coupled to the substrate, wherein at least one of the proof masses is connected to the second support arm at a point between the first end and the second end of the rigid lateral element.

12. The micromachined device of claim 11, wherein the at least one support arm and the second support arm are positioned on the same side of at least one of the proof masses.

13. The micromachined device of claim 11, wherein the at least one support arm and the second support arm are positioned on opposite sides of at least one of the proof masses.

* * * * *